United States Patent [19]

McPherson et al.

[11] Patent Number: 5,602,821
[45] Date of Patent: Feb. 11, 1997

[54] DOUBLE PICKER DRIVE MULTIPLEXING MECHANISM

[75] Inventors: Robert J. McPherson, Eden Prairie; William R. Lynn, Minneapolis, both of Minn.

[73] Assignee: International Data Engineering, Inc., Edina, Minn.

[21] Appl. No.: 552,468

[22] Filed: Nov. 9, 1995

[51] Int. Cl.[6] .................................................. G11B 17/22
[52] U.S. Cl. .............................. 369/178; 369/34; 360/92; 360/98.06; 414/280
[58] Field of Search ................................ 369/178, 36, 38, 369/191, 34; 360/98.04, 98.06, 99.06, 92; 414/277, 280; 294/902

[56] References Cited

U.S. PATENT DOCUMENTS

| | | | |
|---|---|---|---|
| 4,685,095 | 8/1987 | Rudy et al. | 369/36 |
| 4,846,619 | 7/1989 | Crabtree et al. | 414/273 |
| 4,984,108 | 1/1991 | Grant et al. | 414/280 |
| 5,010,536 | 4/1991 | Wanger et al. | 369/36 |
| 5,014,255 | 5/1991 | Wanger et al. | 369/36 |
| 5,101,387 | 3/1992 | Wanger et al. | 369/36 |
| 5,150,341 | 9/1992 | Shibayama | 369/178 |
| 5,362,192 | 11/1994 | Dang | 414/280 |
| 5,460,476 | 10/1995 | Gazza | 360/98.06 |
| 5,481,514 | 1/1996 | Yamasaki et al. | 360/98.06 |

OTHER PUBLICATIONS

"Business Wire" publication, advertising information, 1990.

*Primary Examiner*—Stuart S. Levy
*Assistant Examiner*—Kevin M. Watkins
*Attorney, Agent, or Firm*— Palmatier, Sjoquist, Helget & Voigt, P.A.

[57] ABSTRACT

A single-drive input, double gripper media transport element positionable for accessing storage media cartridges in a cartridge media store and an optical disk drive and simultaneously transporting multiple storage media cartridges comprises a housing, at least two sliders mounted within the housing moving along respective parallel slider paths, a cartridge gripper mounted on each of the sliders, a slider lead screw mounted within the housing for positioning the sliders along their respective slider paths, a slider motor for rotating the slider lead screw, and a lead screw nut on the lead screw for simultaneously or alternately engaging the slider lead screw with each of the sliders.

26 Claims, 5 Drawing Sheets

DOUBLE PICKER DRIVE MULTIPLEXING MECHANISM

BACKGROUND OF THE INVENTION

This invention relates to storage and handling of media cartridges and more particularly to an media transport element for storing and handling optical disc cartridges.

The storage of data in magnetic media, such as floppy discs or tapes, is well known. However, optical discs have been found to be highly advantageous over the magnetic media. This is so because the optical discs have high degrees of integrity and data storage capabilities together with a high level of sensitivity as well as environmental toughness.

The optical disc cartridges which hold laser discs are high-density data storage media. Currently, the media hold 1.3 gigabytes per cartridge which are soon approaching up to 3 gigabytes in the very near future. The cartridges perform the function of protecting the discs from dust and dirt. Optical discs within cartridges are readily available in the marketplace as from Sony Corporation of Tokyo, Japan.

High-capacity (1.3 gigabyte) optical disc drives are currently available in the market such as the Ricoh 5060E, Sony SMO F-521, and IBM 0632 C2A. Typically, optical disc cartridges must be removed and inverted or flipped with reinsertion for the drive to read the other opposite side of the disc within the cartridge. This is because most drives have only one laser thereby requiring the disc to be flipped over or inverted for reading or writing the other side of the disc. However, optical disk drives are beginning to be marketed and soon will be prevalent that will have more than one laser which will allow quick access to the storage data on either side of the optical disc media. In the present invention, the reading and writing of data storage on the optical disc within the cartridge is performed by the drive under the control of a host computer.

Most optical disc cartridge handling apparatuses on the market use several belts and pulleys to perform the functions of: positioning the cartridge transport mechanism adjacent either the optical disc drive or an optical disc cartridge store; flipping the optical disc cartridge to its other side; and inserting and removing the optical disc cartridge in the optical disc drive or cartridge store. Such belt and pulley arrangements are slow, subject to frequent adjustment, and generate substantial amounts of dust within the optical disc handling apparatus. The dust generated by these belts and pulleys has required the optical disc cartridges to be stored vertically within the cartridge store, in order to avoid accumulation of dust on the cartridge. In turn, this cuts down on the storage space available, as most housings are preferably taller than broad.

In order to transport a cartridge between media store locations and an optical disk drive, a media transport element is first positioned at a source storage cell containing a cartridge to be retrieved. A gripper is activated to engage the cartridge and retract it from the storage cell. The media transport element is then positioned at a destination cell and the gripper is again activated to insert the cartridge in the storage cell and release it.

It is desirable to employ two or more grippers in a single media transport element. Using multiple grippers minimizes media transport element travel because plural cartridges can be transported simultaneously.

A disadvantage of prior art, multiple gripper media transport elements is that discrete gripper drive systems are used to control gripper positioning. This requires a duplication of hardware components and associated control system support functionality. The result is increased complexity and cost, as well as reduced response time due to increased media transport element mass caused by hardware and control system redundancy.

Other prior art media transport elements, while having multiple pickers, did not allow the multiple pickers to be positioned both simultaneously or alternately by the media transport element. Consequently, multiple cartridges could not be simultaneously positioned within the media transport element for securely holding the cartridges during positioning of the media transport element.

There is a need for a media transport element having multiple gripper capability but without the attendant disadvantages of multiple gripper drive systems. Additionally, the media transport element must have the capability of positioning multiple cartridges within the media transport element either simultaneously or alternately. The media transport element should have the capability of using only one of the multiple grippers if so desired.

SUMMARY OF THE INVENTION

A single-drive input, double gripper media transport element positionable for accessing storage media cartridges in a cartridge media store and a cartridge media drive such as an optical disk drive and simultaneously transporting multiple storage media cartridges comprises a housing, at least two sliders mounted within the housing moving along respective parallel slider paths, a cartridge gripper mounted on each of the sliders, a slider lead screw mounted within the housing for positioning the sliders along their respective slider paths, a slider motor for rotating the slider lead screw, and a lead screw nut on the lead screw for simultaneously or alternately engaging the slider lead screw with each of the sliders.

A principal object and advantage of the present invention is that it allows multiple cartridges to be simultaneously transported.

Another object and advantage of the present invention is that it allows multiple cartridges to be positioned either simultaneously or alternately within the media transport element.

Another object and advantage of the present invention is that multiple cartridges are simultaneously moved and securely held within the media transport element between positionings of the media transport element.

Another object and advantage of the present invention is that it decreases the number of discrete positionings of the media transport element to move cartridges between the media store and the optical disk drive.

Another object and advantage of the present invention is that it uses a single drive mechanism to engage and position multiple grippers, thus decreasing the cost, complexity and mass of the media transport element.

Another object and advantage of the present invention is that it can, if desired, use only one of multiple grippers to act on cartridges.

DETAILED DESCRIPTION OF THE PREFERRED EMBODIMENTS

Figure 1:
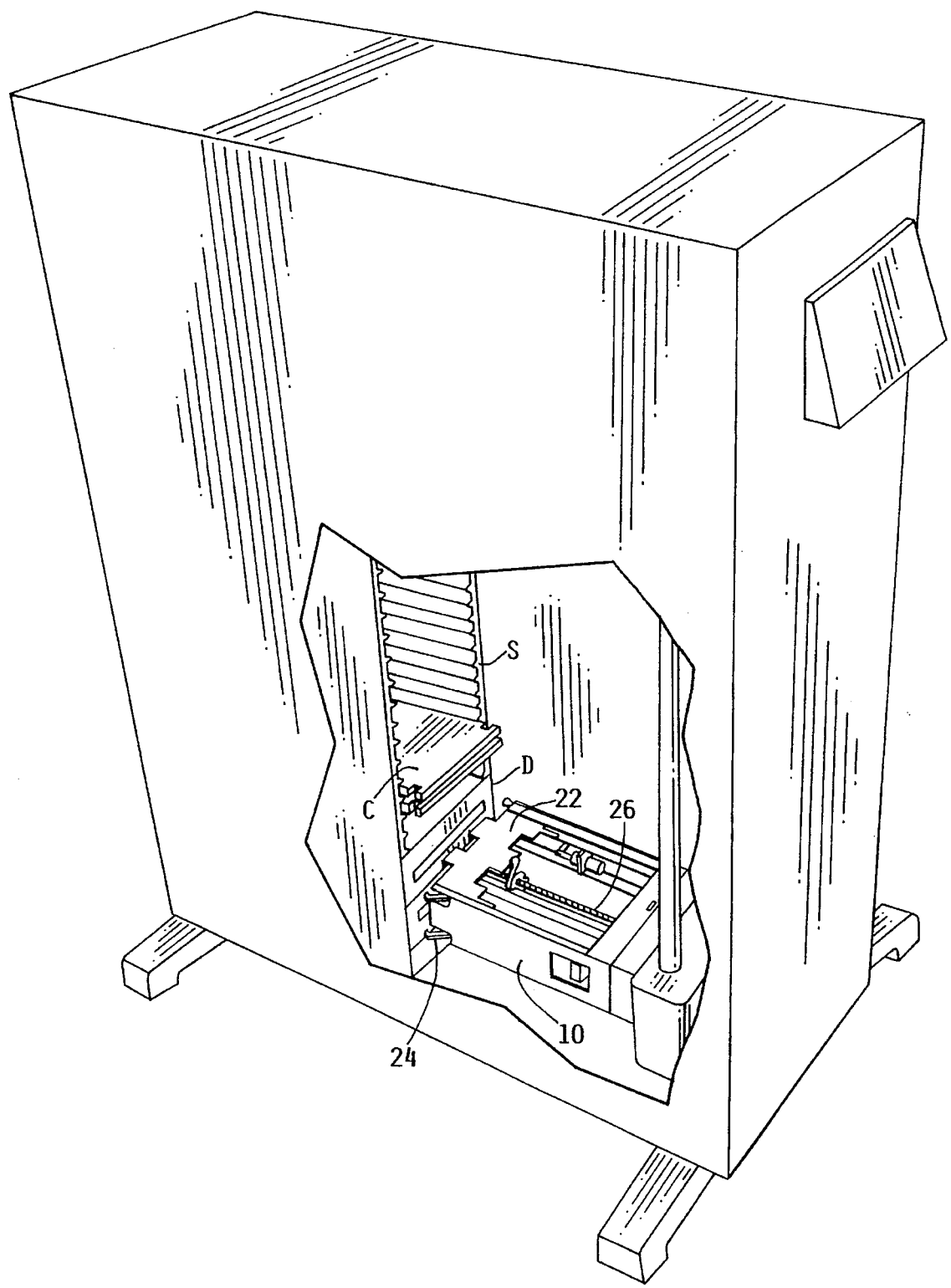
FIG. 1 is a perspective view of an optical disk handling apparatus with some structure cut away to show the media transport element of the present invention.

The single-drive input, double gripper media transport element of the present invention is shown generally in the Figures as reference numeral 10.

Figure 2:
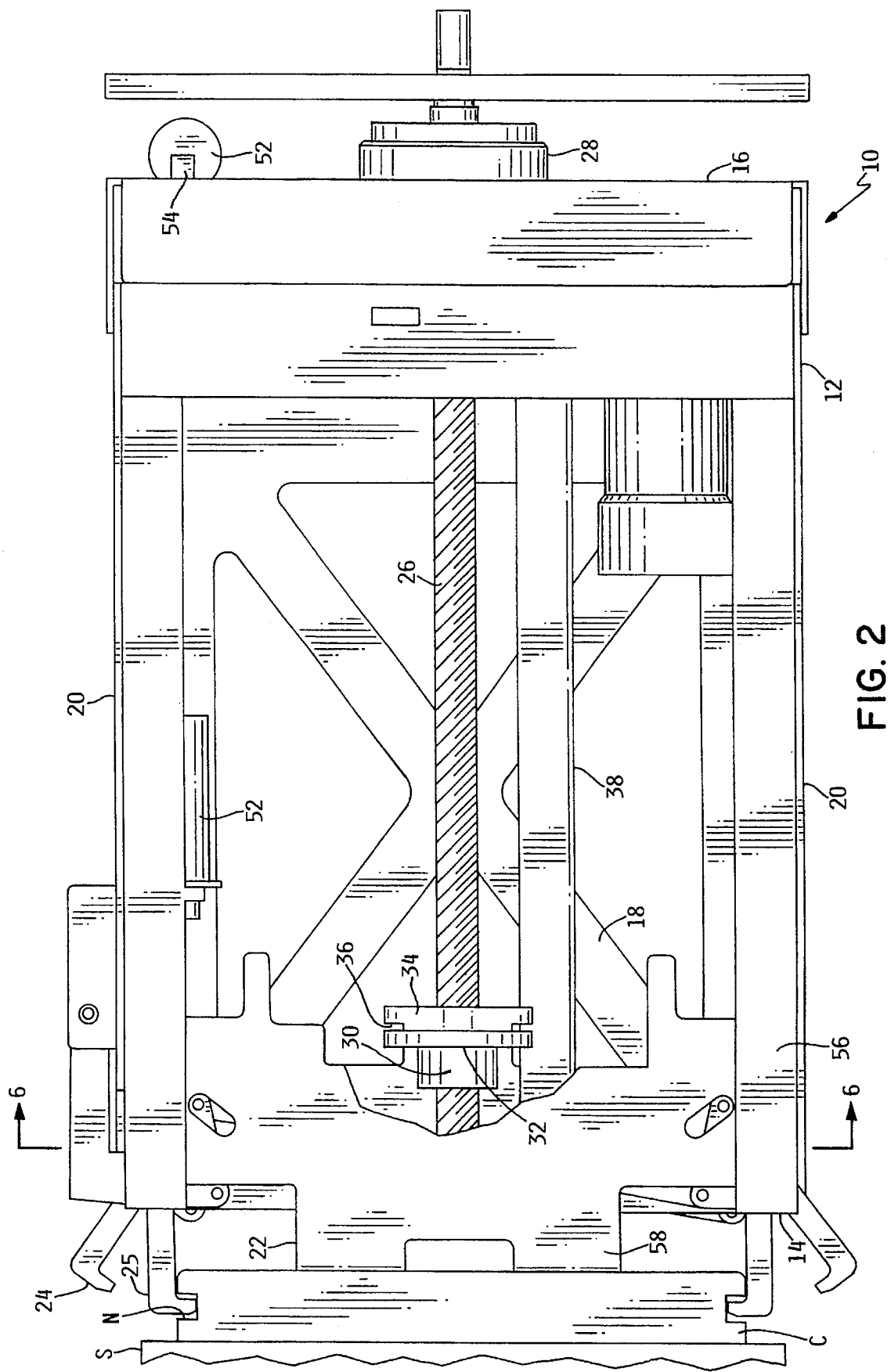
FIG. 2 is a top plan view of the media transport element of the present invention with some structure cut away to show internal structure and with the cartridge positioned adjacent the media store.

As seen in FIG. 1 and FIG. 2, the media transport element 10 is positionable for accessing storage media cartridges C in a cartridge media store S and a cartridge media drive such as an optical disk drive D. At least two cartridge grippers 24 allow the media transport element 10 to simultaneously transport multiple cartridges C.

While the invention is described herein as working with optical disk drives, this is not a limitation. The invention will function with any type of cartridge media, such as CDS, tape, etc, and with the corresponding drive.

Figure 3:
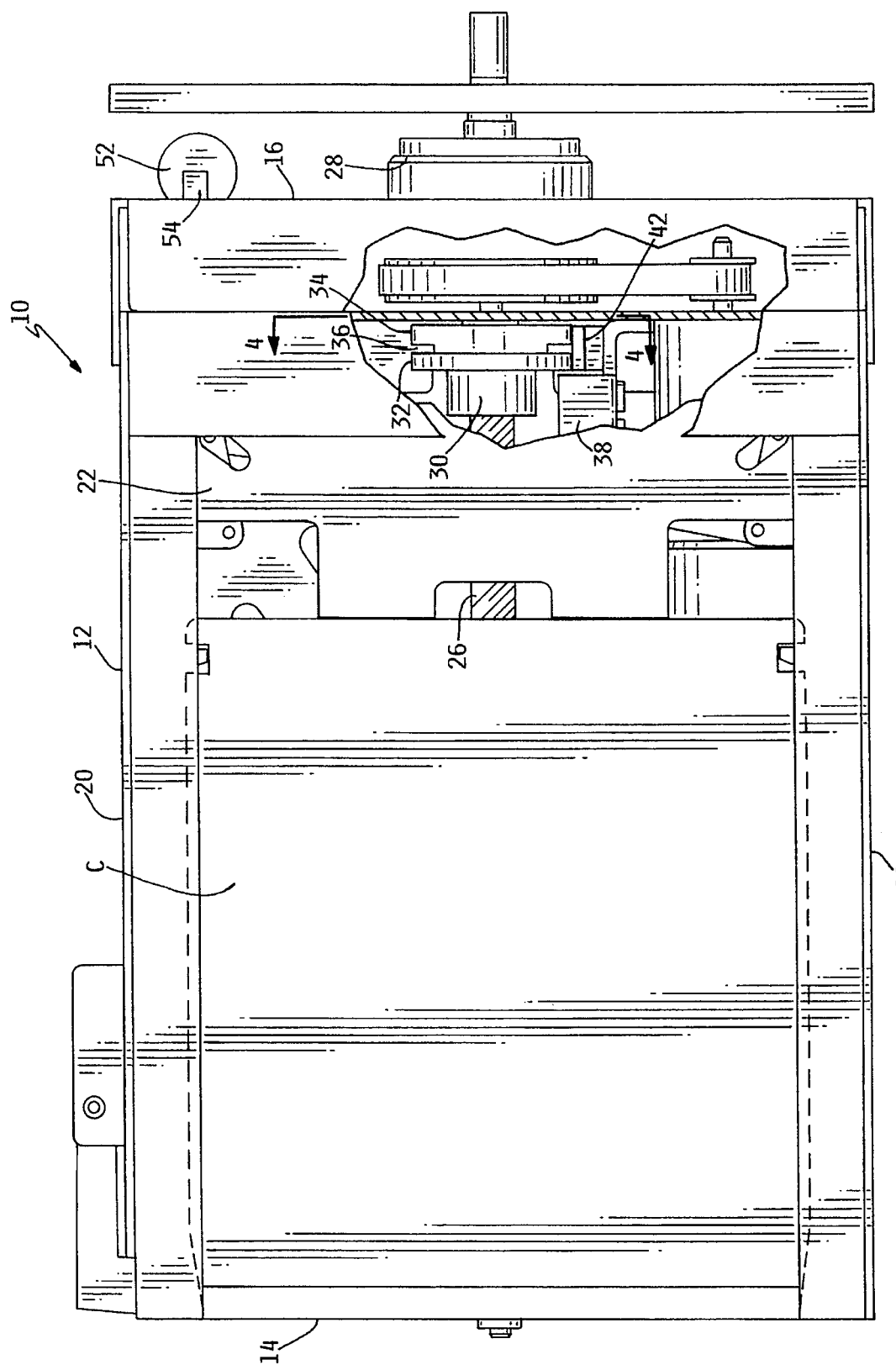
FIG. 3 is a top plan view of the media transport element of the present invention with some structure cut away to show internal structure and with the cartridge positioned within the media transport element.

As can be most readily seen in FIGS. 2 and 3, the media transport element 10 comprises a housing 12 having a front 14 adjacent the media store S and optical disk drive D; a rear 16; a bottom 18; and two sides 20.

At least two sliders 22 are mounted within the housing 12 for moving the cartridges C into and out of the housing 12 from the media store S and the optical disk drive D. Preferably, the sliders 22 move along respective parallel slider paths toward and away from the media store S.

A cartridge gripper 24 is mounted on each of the sliders 22. The cartridge gripper 24 preferably comprises spaced fingers 25 which grip the notches N in the cartridges C. Other gripper mechanisms such as pins or rollers are possible.

A driven slider lead screw 26 is mounted within the housing 12 for positioning the sliders 22 along their respective slider paths. A slider motor 28 is provided preferably on the housing 12 for driving the slider lead screw 26.

A novel lead screw nut 30 is mounted on the slider lead screw 26. The nut 30 simultaneously or alternately engages the slider lead screw 26 with each of the sliders 22, as will be more particularly described below.

The novel and inventive lead screw nut 30 of the present invention comprises a full circle flange 32 mounted on the slider lead screw 26 toward the media store S. A part circle flange 34 is also mounted on the slider lead screw 26 toward the rear 16. Between the full circle flange 32 and the part circle flange 34 is a channel 36. The full circle flange 32, part circle flange 34, and channel 36 are preferably constructed of a single piece of plastic material by molding.

Figure 5:
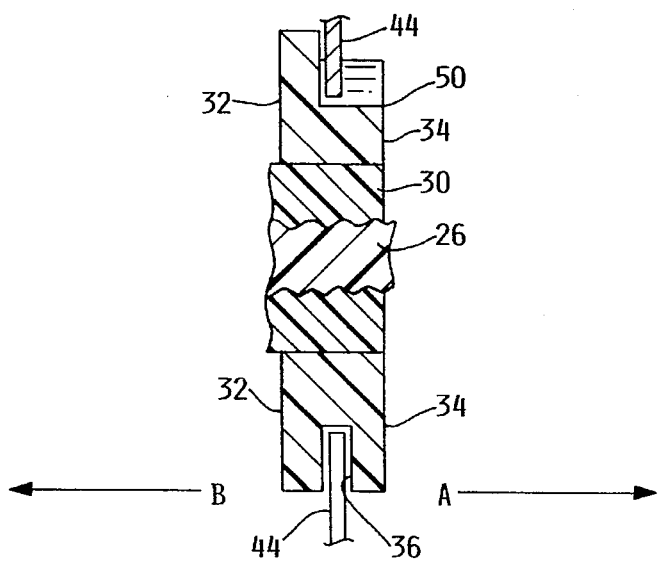
FIG. 5 is a cross-sectional view along the lines 5 in FIG. 4.
Figure 6:
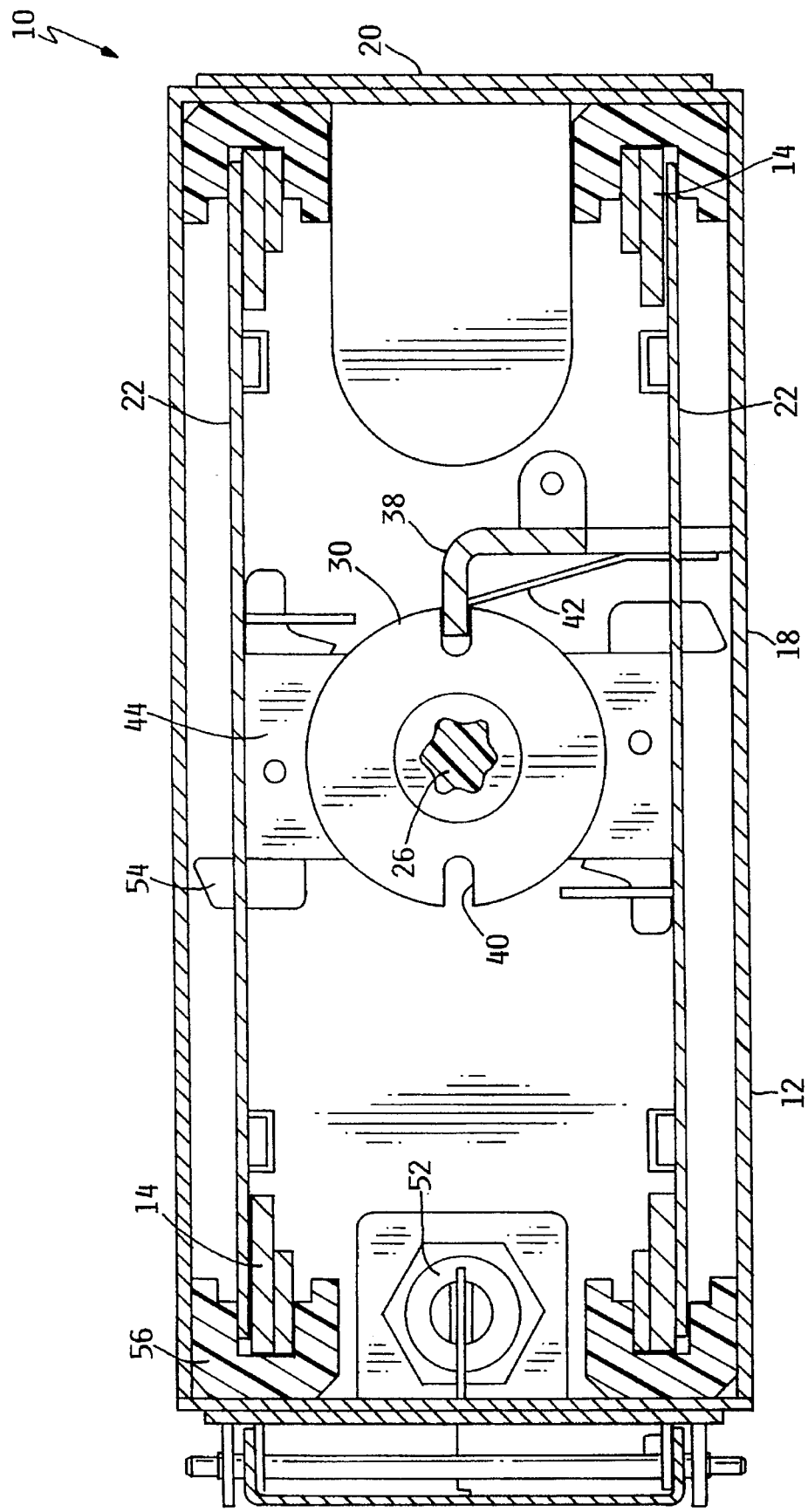
FIG. 6 is a cross-sectional view along the lines 6 in FIG. 2.

As best seen in FIG. 5, the full circle flange 32 engages each of the sliders 22 to move the said sliders 22 simultaneously away from the media store S, in the direction indicated by the arrow A. Preferably, the sliders 22 have upright tabs 44 substantially normal to the sliders 22, the tabs 44 engaging the channel 36. As can be seen, when the slider lead screw nut 30 moves in the direction A, the full circle flange 32 engages both tabs 44, causing both sliders to move in the direction A away from the media store S. In this manner, the media transport element 10 ensures that both cartridges C will be securely retained within the media transport element 10 as the media transport element 10 moves between locations in the media store S.

To insert one of the cartridges C into the media store S or optical disk drive D, the lead screw nut 30 moves in the direction B as the lead screw 26 rotates. When the lead screw nut 30 moves in the direction B, toward the media store S, the part circle flange 34 engages only one of the tabs 44. In FIG. 5, the part circle flange 34 is seen engaging the lower tab 44. Nothing engages the upper tab 44 in FIG. 5. Thus, only the lower slider 22 will be moved in direction B. In addition, the upper slider 22 is locked in position as will be further described. As a result, only the upper slider 22 will insert its cartridge C into the media store S or optical disk drive D. Of course, the selection is reversible, so that each of the sliders may be moved alternately toward the media store S, as will be described below. Also, the same slider may be continually used, without reversal.

In order for the sliders 22 to be moved along their respective parallel slider paths by the lead screw 26, the lead screw nut 30 must not rotate with the lead screw 26. Preferably, an anti-rotation rail 38 is mounted parallel to the lead screw 26 to prevent such rotation. The anti-rotation rail 38 preferably engages anti-rotation slots 40 in the lead screw nut 30 to prevent rotation of the lead screw nut 30 with rotation of the lead screw 26 and thereby causes the lead screw nut 30 to move toward and away from the media store S as the lead screw 26 is rotated.

Figure 4:
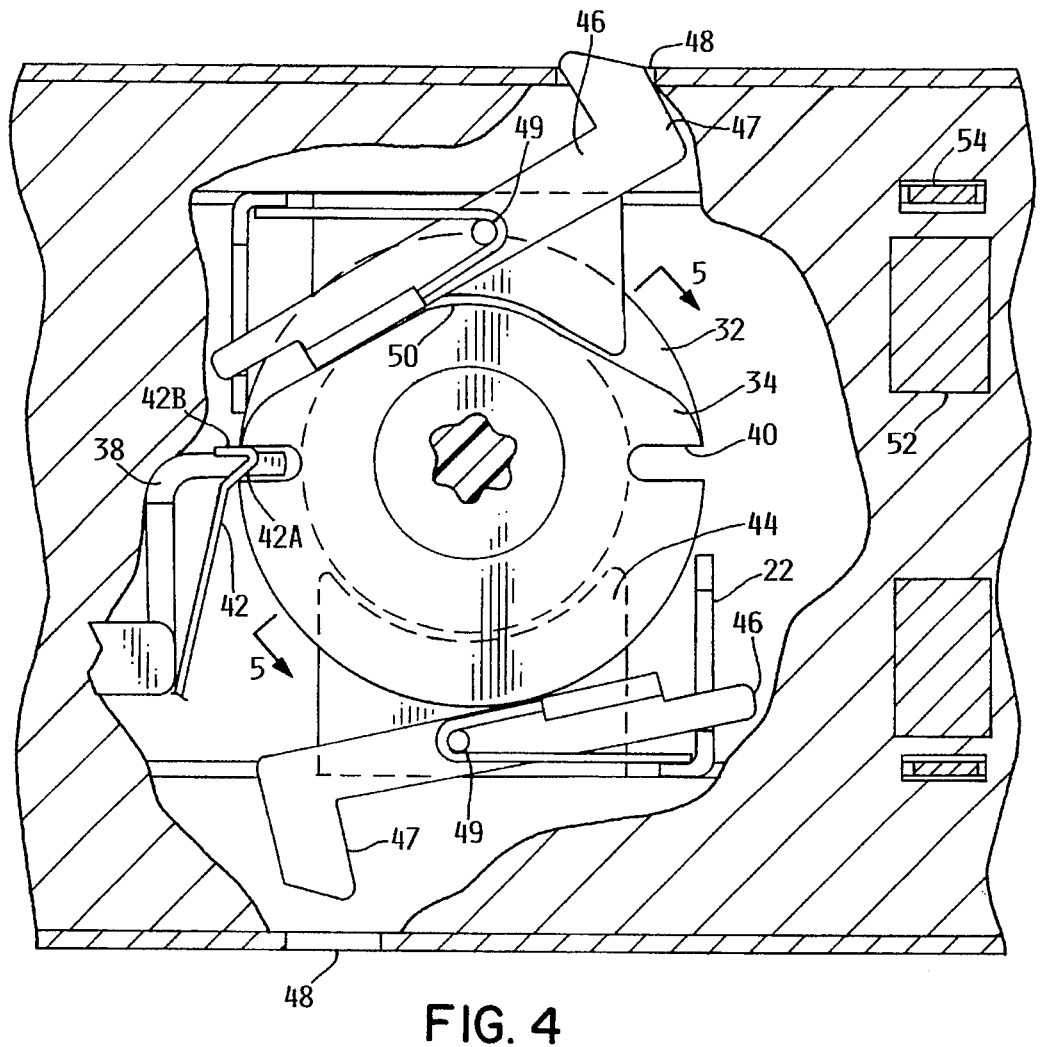
FIG. 4 is a cross-sectional view along the lines 4 in FIG. 3.

Adjacent the end of the lead screw 26 nearest the rear 16, a spring-biased pawl 42 may be mounted, preferably on the rear 16. As best seen in FIG. 4, the pawl 42 will engage one of the anti-rotation slots 40 in the lead screw nut 30. As a result, when the lead screw 26 is rotated in one direction, in FIG. 4 clockwise, the pawl 42 will be pushed against the spring bias and pushed out of the anti-rotation slot 40 by the anti-rotation slot 40 pressing against the rounded shoulder 42A, thus allowing clockwise rotation of the lead screw nut 30 as seen from the direction of FIG. 4. However, when the lead screw 26 is rotated oppositely, the flat portion 42B will engage the anti-rotation slot 40 and prevent any rotation of the lead screw nut 30. Additionally, the flat portion 42B is preferably in line with the anti-rotation rail 38, so that as the lead screw nut 30 begins its travel toward the media store S, the anti-rotation rail 38 will engage the anti-rotation slot 40.

As best seen in FIG. 4, the media transport element 10 preferably further includes a spring-biased locking lever 46 on each of the sliders 22. The spring (not shown) biases the locking lever 46 so that the locking tab 47 engages a locking hole 48 in the housing 12 when the slider 22 is moved against the rear 16. When the locking lever 46 is so engaged, the slider 22 can not move.

To allow motion of one of the sliders 22, the part circle flange 34 when rotated causes the locking lever 46 to pivot on its fulcrum 49 so that the locking tab 47 is biased away from the locking hole 48, as seen in the bottom of FIG. 4. Simultaneously, the cam portion 50 of the part circle flange 34 allows the other locking lever 46 to be biased by the spring and thus allows the other locking tab 47 to engage the other locking hole 48.

The media transport element 10 also preferably has an encoder 52 for determining the position of the sliders 22 within the media transport element 10. Preferably, the encoder 52 is driven by the slider motor 28.

The media transport element 10 also preferably includes a sensor 52 for detecting the presence of one the sliders 22 adjacent the rear 16. As best seen in FIGS. 2 and 4, the sensor preferably consists of an optical sensor 52 that detects the presence of a tab 54 on the slider 22.

The media transport element 10 also preferably includes slider guides 56 in the housing 12 for supporting the sliders 22 as the sliders 22 move along their respective slider paths.

The media transport element 10 also preferably includes a cartridge pusher 58 for pushing the cartridge C as the sliders 22 move toward the media store S.

With the foregoing in mind, the operation of the media transport element 10 may now be described.

Both sliders 22 will be initially positioned adjacent the rear 16. Both tabs 54 will interrupt both sensors 52, giving a positive indication of the position of both sliders 22. One of the sliders 22 will be free to move because its locking lever 46 will be disengaged from the locking hole 48 as described above. As shown in FIG. 4, for example, the lower slider 22 will be free to move.

Also as shown in FIG. 4, the part circle flange 34 will engage the slider tab 44 of the lower slider 22. The part circle flange 34 will not engage the slider tab 44 of the upper slider 22 because the cam portion 50 will bypass the upper tab 44.

The slider motor 28 will now be engaged, causing the lead screw 26 to turn counterclockwise as seen from FIG. 4. The counterclockwise rotation of the lead screw nut 30 is prevented by the pawl 42 as described above. As the lead screw nut 30 moves forward off the pawl 42, the anti-rotation slot 40 will engage the anti-rotation rail 38 and the lead screw nut 30 will continue to move forward.

The slider 22 moving forward will eventually become positioned by media transport element positioning means (not shown) opposite a slot in the media store S containing a cartridge C. The cartridge gripper 24 will grip the notch N in the cartridge C as shown in FIG. 2.

The encoder 52 will have kept track of the position of the slider 22 and will now signal the slider motor 28 to reverse direction, causing the cartridge C to be drawn out of the media store S and into the housing 12.

Both of the sliders 22 will now be drawn toward the rear 16 by the full circle flange engaging both slider tabs 44.

When the lead screw nut reaches the rear 16, the engagement of the lead screw nut with the sliders 22 may be preferably changed as follows.

The lead screw nut will disengage from the anti-rotation rail, which will allow the lead screw nut to rotate clockwise. As it does so, the pawl 42 will disengage from the anti-rotation slot 40 as described above. Continued clockwise rotation of the lead screw nut 30 through 180 degrees will bring the opposite anti-rotation slot into engagement with the pawl 42. At the same time, the part circle flange 34 will bias the locking lever of the upper slider 22 in FIG. 4 so that the locking tab 47 of that slider disengages from the locking hole 48. The upper slider is now free to move. Simultaneously, the lower locking lever 46 will engage the lower locking hole 48, locking the lower slider 22 in place.

The slider motor 28 will now reverse again, causing counter-clockwise rotation of the lead screw 26. Counterclockwise rotation of the lead screw nut 30 is prevented by the pawl and anti-rotation rail as described above. Thus, the upper slider will move toward the media store for accepting another cartridge C.

It will be apparent to those skilled in the art that this novel media transport element 10 cuts down on the number of positionings of the media transport element 10 to move cartridges C between the media store S and the optical disk drive D. For example, to exchange two cartridges that are close to each other in the media store, the media transport element 10 may be positioned to remove one cartridge from the media store S, move to the optical disk drive, insert the other cartridge into the optical disk drive, and return to the media store S to store the removed cartridge with only two long-distance movements between the media store S and the optical disk drive D.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A single-drive input, double gripper media transport element positionable for accessing storage media cartridges in a cartridge media store and an optical disk drive and simultaneously transporting multiple storage media cartridges, said media transport element comprising:

a housing having a front adjacent the media store and optical disk drive and a rear opposite the media store and optical disk drive, at least two sliders mounted within said housing for moving the cartridge into and out of said housing from the media store and the optical disk drive, said sliders moving along respective parallel slider paths alternately toward and simultaneously away from one of the media store and disk drive, a cartridge gripper mounted on each of said sliders, a driven slider lead screw mounted within said housing for positioning said sliders along their respective slider paths, and a lead screw nut on said lead screw for simultaneously or alternately engaging said slider lead screw with each of said sliders.

2. The media transport element of claim 1, said lead screw nut comprising a full circle flange mounted on said lead screw toward the media store, a part circle flange mounted on said lead screw toward the rear of said housing, and a channel between said full circle flange and said part circle flange, said full circle flange engaging each of said sliders to move said sliders simultaneously away from one of said media store and optical disk drive, and said part circle flange engaging one of said sliders to move one of said sliders toward one of the media store and optical disk drive.

3. The media transport element of claim 2, further comprising an anti-rotation rail mounted parallel to said lead screw, said anti-rotation rail engaging anti-rotation slots in said lead screw nut and preventing rotation of said lead screw nut with rotation of said lead screw and thereby causing said lead screw nut to move toward and away from one of the media store and optical disk drive as said lead screw is rotated.

4. The media transport element of claim 3, further comprising a spring-biased pawl mounted on said housing, said pawl engaging said anti-rotation slots and allowing rotation of said lead screw nut concentrically in one direction with rotation of said lead screw and preventing rotation of said lead screw nut concentrically in the other direction with rotation of said lead screw.

5. The media transport element of claim 2, wherein each slider further comprises an upright tab substantially normal to said slider, said tab engaging said channel in said lead screw nut.

6. The media transport element of claim 2, wherein said slider further comprises a spring-biased locking lever which engages a locking hole in said housing to prevent movement of said sliders, said part circle flange biasing said locking lever away from said locking hole to allow movement of one of said sliders.

7. The media transport element of claim 1, further comprising an encoder for determining the position of said sliders within said media transport element.

8. The media transport element of claim 1, further comprising a sensor for detecting the presence of one of said sliders adjacent the rear of said housing.

9. The media transport element of claim 1, further comprising slider guides for supporting said sliders.

10. The media transport element of claim 1, further comprising a cartridge pusher on said sliders for pushing the cartridge into one of the media store and optical disk drive.

11. A single-drive input, double gripper media transport element positionable for accessing storage media cartridges in a cartridge media store and an optical disk drive and simultaneously transporting multiple storage media cartridges, said media transport element comprising:

a housing having a front adjacent the media store and optical disk drive and a rear opposite the media store and optical disk drive, at least two sliders mounted within said housing for moving the cartridge into and out of said housing from the media store and the optical disk drive, said sliders moving along respective parallel slider paths alternately toward and simultaneously away from one of the media store and optical disk drive, a cartridge gripper mounted on each of said sliders, a driven slider lead screw mounted within said housing for positioning said sliders along their respective slider paths, and a lead screw nut on said lead screw for simultaneously or alternately engaging said slider lead screw with each of said sliders, said lead screw nut comprising a full circle flange mounted on said lead screw toward the media store, a part circle flange mounted on said lead screw toward the rear of said housing, and a channel between said full circle flange and said part circle flange, said full circle flange engaging each of said sliders to move said sliders simultaneously away from said media store and optical disk drive, and said part circle flange engaging one of said sliders to move one of said sliders toward one of the media store and optical disk drive.

12. The media transport element of claim 11, further comprising an anti-rotation rail mounted parallel to said lead screw, said anti-rotation rail engaging anti-rotation slots in said lead screw nut and preventing rotation of said lead screw nut with rotation of said lead screw and thereby causing said lead screw nut to move toward and away from one of the media store and optical disk drive as said lead screw is rotated.

13. The media transport element of claim 12, further comprising a spring-biased pawl mounted on said housing, said pawl engaging said anti-rotation slots and allowing rotation of said lead screw nut concentrically in one direction with rotation of said lead screw and preventing rotation of said lead screw nut concentrically in the other direction with rotation of said lead screw.

14. The media transport element of claim 11, wherein each slider further comprises an upright tab substantially normal to said slider, said tab engaging said channel in said lead screw nut.

15. The media transport element of claim 11, wherein said slider further comprises a spring-biased locking lever which engages a locking hole in said housing to prevent movement of said sliders, said part circle flange biasing said locking lever away from said locking hole to allow movement of one of said sliders.

16. The media transport element of claim 11, further comprising an encoder for determining the position of said sliders within said media transport element.

17. The media transport element of claim 11, further comprising a sensor for detecting the presence of one of said sliders adjacent the rear of said housing.

18. The media transport element of claim 11, further comprising slider guides for supporting said sliders.

19. The media transport element of claim 11, further comprising a cartridge pusher on said sliders for pushing the cartridge into one of the media store and optical disk drive.

20. A single-drive input, double gripper media transport element positionable for accessing storage media cartridges in a cartridge media store and an optical disk drive and simultaneously transporting multiple storage media cartridges, said media transport element comprising:

a housing having a front adjacent the media store and optical disk drive, a rear opposite the media store and optical disk drive, at least two sliders mounted within said housing for moving the cartridge into and out of said housing from the media store and the optical disk drive, said sliders moving along respective parallel slider paths alternately toward and simultaneously away from one of the media store and optical disk drive, a cartridge gripper mounted on each of said sliders, a driven slider lead screw mounted within said housing for positioning said sliders along their respective slider paths, a lead screw nut on said lead screw for simultaneously or alternately engaging said slider lead screw with each of said sliders, said lead screw nut comprising a full circle flange mounted on said lead screw toward the media store, a part circle flange mounted on said lead screw toward the rear of said housing, and a channel between said full circle flange and said part circle flange, said full circle flange engaging each of said sliders to move said sliders simultaneously away from one of said media store and optical disk drive, and said part circle flange engaging one of said sliders to move one of said sliders toward one of the media store and optical disk drive, wherein each slider further comprises an upright tab substantially normal to said slider, said tab engaging said channel in said lead screw nut, an anti-rotation rail mounted parallel to said lead screw, said anti-rotation rail engaging anti-rotation slots in said lead screw nut and preventing rotation of said lead screw nut with rotation of said lead screw and thereby causing said lead screw nut to move toward and away from one of the media store and optical disk drive as said lead screw is rotated, a spring-biased pawl mounted on said housing, said pawl engaging said anti-rotation slots and allowing rotation of said lead screw nut concentrically in one direction with rotation of said lead screw and preventing rotation of said lead screw nut concentrically in the other direction with rotation of said lead screw, and a spring-biased locking lever which engages a locking hole in said housing to prevent movement of said sliders, said part circle flange biasing said locking lever away from said locking hole to allow movement of one of said sliders.

21. The media transport element of claim 20, further comprising an encoder for determining the position of said sliders within said media transport element.

22. The media transport element of claim 20, further comprising a sensor for detecting the presence of one of said sliders adjacent the rear of said housing.

23. The media transport element of claim 20, further comprising slider guides for supporting said sliders.

24. The media transport element of claim 20, further comprising a cartridge pusher on said sliders for pushing the cartridge into one of the media store and optical disk drive.

25. A single-drive input, double gripper media transport element positionable for accessing storage media cartridges in a cartridge media store and simultaneously transporting multiple storage media cartridges, said media transport element comprising:

a housing having a front adjacent the media store and a rear opposite the media store, at least two sliders mounted within said housing for moving the cartridge into and out of said housing from the media store, said sliders moving along respective parallel slider paths alternately toward and simultaneously away from the media store, a cartridge gripper mounted on each of said sliders, a driven slider lead screw mounted within said housing for positioning said sliders along their respective slider paths, and a lead screw nut on said lead screw for simultaneously or alternately engaging said slider lead screw with each of said sliders.

26. The media transport element of claim 25, said lead screw nut comprising a full circle flange mounted on said lead screw toward the media store, a part circle flange mounted on said lead screw toward the rear of said housing, and a channel between said full circle flange and said part circle flange, said full circle flange engaging each of said sliders to move said sliders simultaneously away from the media store, and said part circle flange engaging one of said sliders to move one of said sliders toward the media store.

* * * * *